(12) United States Patent
Bang et al.

(10) Patent No.: US 8,514,182 B2
(45) Date of Patent: Aug. 20, 2013

(54) TOUCH PANEL DISPLAY DEVICE AND METHOD OF FABRICATING THE SAME

(75) Inventors: Yong Ik Bang, Daegu (KR); Tae Ho You, Incheon (KR); Hee Jung Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 129 days.

(21) Appl. No.: 10/320,644

(22) Filed: Dec. 17, 2002

(65) Prior Publication Data
US 2003/0122797 A1   Jul. 3, 2003

(30) Foreign Application Priority Data

Dec. 27, 2001 (KR) ................................. 2001-85969

(51) Int. Cl.
*G06F 3/041* (2006.01)
*G06K 11/06* (2006.01)
*G08C 21/00* (2006.01)

(52) U.S. Cl.
USPC ...... 345/173; 345/178; 178/18.01; 178/18.03

(58) Field of Classification Search
USPC . 345/156, 173–178; 178/18.01, 18.03–18.11
See application file for complete search history.

(56) References Cited

U.S. PATENT DOCUMENTS

| 6,233,139 | B1 * | 5/2001 | Hamon | 361/681 |
|---|---|---|---|---|
| 6,337,694 | B1 * | 1/2002 | Becker et al. | 345/684 |
| 6,473,074 | B1 * | 10/2002 | Okahashi | 345/174 |
| 2003/0112227 | A1 * | 6/2003 | Hong | 345/173 |

FOREIGN PATENT DOCUMENTS

JP           5-4256           1/1993

\* cited by examiner

*Primary Examiner* — Srilakshmi K Kumar
(74) *Attorney, Agent, or Firm* — McKenna Long & Aldridge LLP (57) ABSTRACT

A touch panel display device includes a display panel having a scroll bar, an upper transparent sheet bonded to the display panel, a lower transparent sheet separated from the upper transparent sheet, an upper transparent film formed on the upper transparent sheet having a first electrode is formed perpendicularly crossing the scroll bar, and a lower transparent film formed on the lower transparent sheet having a second electrode.

14 Claims, 6 Drawing Sheets

TOUCH PANEL DISPLAY DEVICE AND METHOD OF FABRICATING THE SAME

The present invention claims the benefit of Korean Patent Application No. P2001-85969 filed in Korea on Dec. 27, 2001, which is hereby incorporated by reference.

BACKGROUND OF THE INVENTION

1. Field of the Invention

The present invention relates to a display device, and more particularly to a touch panel display device and method of fabricating a touch panel display device.

2. Description of the Related Art

A touch panel device is commonly used for inputting a corresponding order by applying pressure to a position using a finger or a tool, such as a stylus. For example, the touch panel device is commonly used in automated teller machines (ATMs), and in portable information devices, such as personal display apparatus (PDA), notebook computers, and desktop personal computers. In general, liquid crystal displays (LCDs) are commonly used as the image display device to which the touch panel is mounted.

Figure 1:
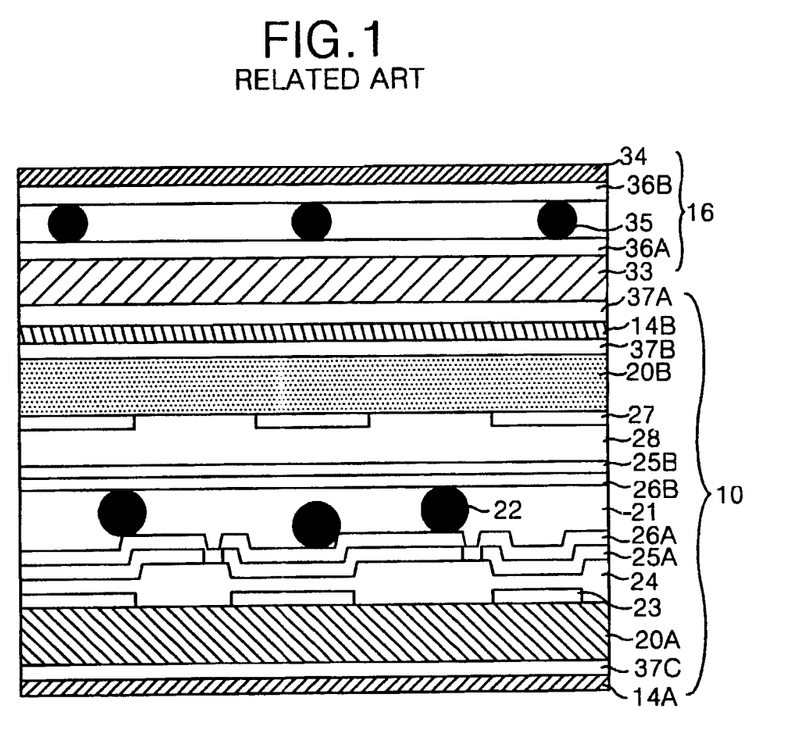
FIG. 1 is a cross sectional view of a touch panel display device according to the related art.

FIG. 1 is a cross sectional view of a touch panel display device according to the related art. In FIG. 1, a touch panel display device according to the related art includes a touch panel 16 bonded to a liquid crystal display panel 10. Positioned between a lower glass substrate 20A and an upper glass substrate 20B of the liquid crystal display panel 10 are interposed liquid crystal material 21 and a ball spacer 22. A lower plate of the liquid crystal display panel 10 includes a gate line 23, an insulation film 24, a pixel electrode 25A, and an alignment film 26A, which are deposited on an entire surface of the lower glass substrate 20A. In addition, the lower plate of the liquid crystal display panel 10 includes a polarized sheet 14A bonded to a rear surface of the lower glass substrate 20A by an adhesive 37C.

An upper plate of the liquid crystal display panel 10 includes a black matrix 27, a color filter 28, a common electrode 25B, and an alignment film 26B deposited on a rear surface of the upper glass substrate 20B that faces the lower glass substrate 20A. In addition, the upper plate of the liquid crystal display panel 10 includes a polarized sheet 14B that is bonded to an entire surface of the upper glass substrate 20B by an adhesive 37B. A backlight unit 12 (in FIG. 4) is positioned facing the lower plate of the liquid crystal display panel 10. The backlight unit 12 provides irradiated light to the liquid crystal display panel 10.

The touch panel 16 includes a lower transparent sheet 33 bonded to the upper polarized sheet 14B of the liquid crystal display panel 10, a lower transparent film 36A formed on the lower transparent sheet 33, an upper transparent film 36B formed on an upper transparent sheet 34, and a spacer 35 formed between the lower transparent film 36A and the upper transparent film 36B. The spacer 35 uniformly maintains a gap between the upper plate and the lower plate of the touch panel 16. The upper and the lower transparent films 36A and 36B are formed of a material, such as indium-tin-oxide (ITO), indium-zinc-oxide (IZO), and indium-tin-zinc-oxide (ITZO).

Figure 2:
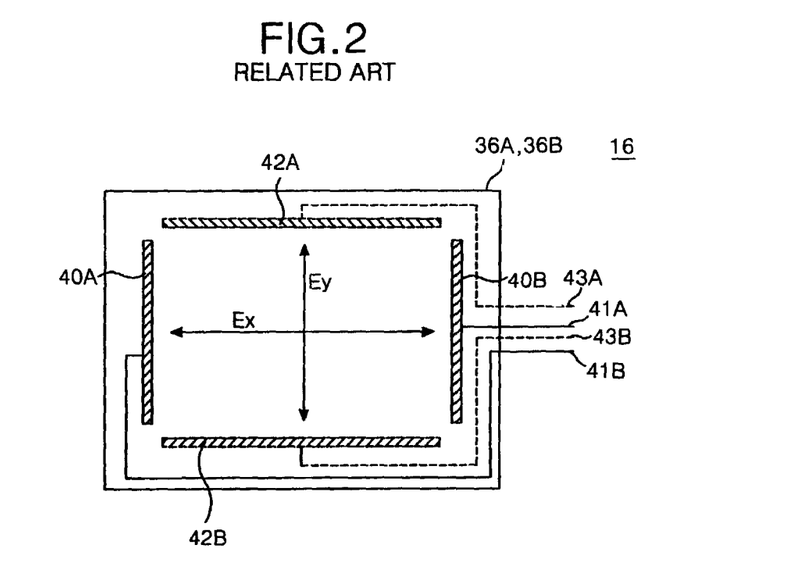
FIG. 2 is a plan view of an electrode structure of FIG. 1 according to the related art.
Figure 3:
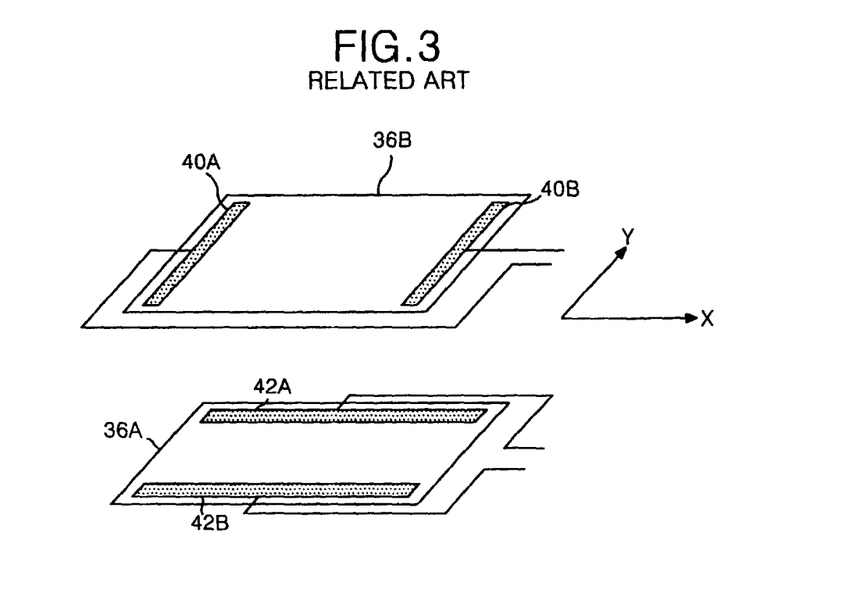
FIG. 3 is a perspective view of an electrode structure of the touch panel display device of FIG. 1 according to the related art.

FIG. 2 is a plan view of an electrode structure of FIG. 1 according to the related art, and FIG. 3 is a perspective view of an electrode structure of the touch panel display device of FIG. 1 according to the related art. In FIGS. 2 and 3, along left and right side edges of the upper transparent film 36B are formed Y-axis electrodes 40A and 40B. The Y-axis electrodes 40A and 40B are formed by printing silver Ag on the upper transparent film 36B, and are electrically connected to tail lines 41A and 41B having a pad area in a middle portion of the right side edge to transmit power from the tail lines 41A and 41B. Along top and bottom side edges of the lower transparent film 36A are formed X-axis electrodes 42A and 42B. The X-axis electrodes 42A and 42B are formed by printing silver Ag on the lower transparent film 36A, and are electrically connected to tail lines 43A and 43B having a pad area in a middle portion of the right side edge to transmit power from the tail lines 43A and 43B. Accordingly, if a voltage is applied to the Y-axis electrodes 40A and 40B, an electric field Ex along an X-axis direction is applied between the Y-axis electrodes 40A and 40B. Similarly, if a voltage is applied to the X-axis electrodes 42A and 42B, an electric field Ey along a Y-axis direction is applied between the X-axis electrodes 42A and 42B. If the upper transparent sheet 34 is pressed by a stylus pen or a finger at a specific region, the upper transparent film 36A and the lower transparent film 36B are electrically shorted together at the specific region. Thus, since a resistance value between the X-axis and Y-axis electrodes 42A, 42B, 40A, and 40B varies in accordance with a location of the specific region, current and voltage levels change.

Figure 4:
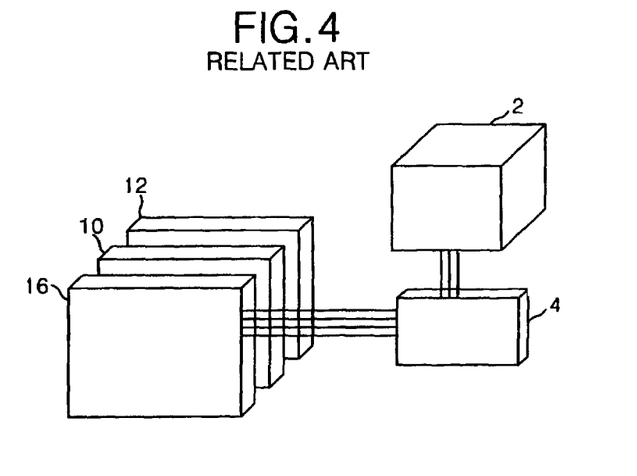
FIG. 4 is a perspective view of a touch panel display device system according to the related art.

FIG. 4 is a perspective view of a touch panel display device system according to the related art. In FIG. 4, power is supplied to the touch panel 16 from a power supply (not shown) inside a system main body through the tail lines 41A, 41B, 43A, and 43B. Accordingly, if the power is supplied to the touch panel 16 and the upper transparent sheet 34 of the touch panel 16 is pressed at a specific position, coordinate signals of the corresponding position is supplied to a touch panel controller 4. Then, the touch panel controller 4 supplies the coordinate signals input from the touch panel 16 to the system main body 2. The system main body 2 supplies a driving signal and video data to the liquid crystal display panel 10, and supplies the power to the touch panel 16. In addition, the system main body 2 analyzes the coordinate signals input from the touch panel controller 4 and executes a corresponding order or an application program related thereto.

Figure 5:
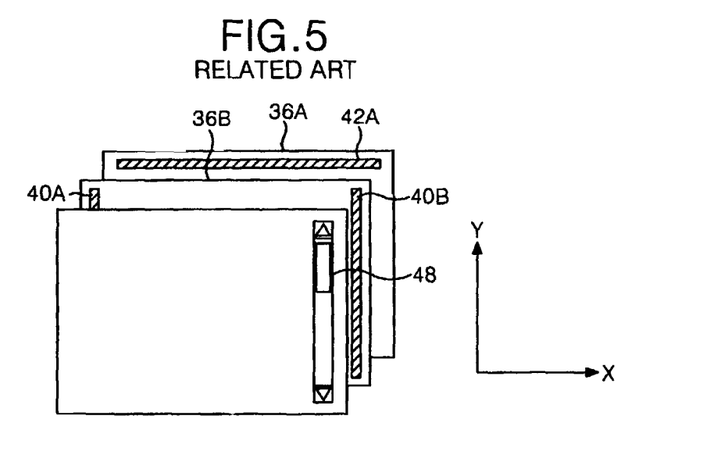
FIG. 5 is a perspective view of touch panel display device according to the related art.

However, the transparent conductive film on the upper transparent sheet 34 that is directly contacted by the finger or stylus can be easily damaged or broken. For example, when executing an computer application program, a scroll bar 48 is displayed along a right edge of a corresponding computer application window, as shown in FIG. 5. If the scroll bar 48 is moved along a Y-axis direction while pressing the upper transparent sheet 34 on the touch panel 16 with a finger or stylus, the upper transparent film 36B may be damaged or broken during operation. If the upper transparent film 36B is broken, reliability of operation that a screen is scrolling upward and downward on the scroll bar 48 is compromised. In addition, if the upper transparent film 36B is broken, the touch panel 16 will not function properly. Specifically, the edge of the touch panel 16 where the scroll bar 48 is located is considered a dead space margin (DSM) area where a height difference is generated between the Y-axis electrodes 40a and 40b and the upper transparent film 36B. Accordingly, the upper transparent film 36B is more likely to be broken.

SUMMARY OF THE INVENTION

Accordingly, the present invention is directed to a touch panel display device and a method of fabricating a touch panel display device that substantially obviates one or more of the problems due to limitations and disadvantages of the related art.

An object of the present invention to provide a touch panel display device that minimizes damage to a transparent conductive film.

Another object of the present invention to provide a method of fabricating a touch panel display device that minimizes damage to a transparent conductive film.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel display device includes a display panel having a scroll bar, a lower transparent sheet bonded to the display panel, an upper transparent sheet separated from the lower transparent sheet, an upper transparent film formed on the upper transparent sheet having a first electrode is formed perpendicularly crossing the scroll bar, and a lower transparent film formed on the lower transparent sheet having a second electrode.

In another aspect, a method of fabricating a touch panel display device includes providing a display panel having a scroll bar, forming a conductive transparent film on each of an upper transparent sheet and a lower transparent sheet, forming a first electrode along a direction perpendicularly crossing a direction of the scroll bar on an upper transparent film formed on the upper transparent sheet, and forming a second electrode on a lower transparent film formed on the lower transparent sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 6:
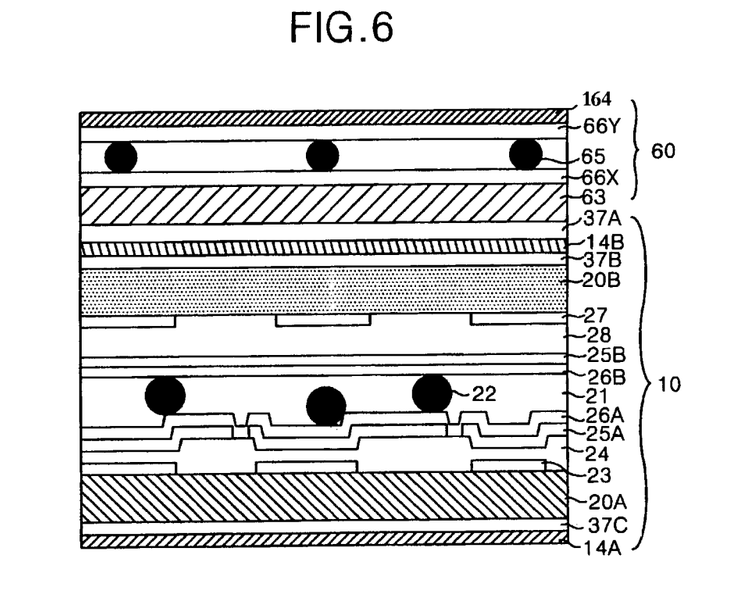
FIG. 6 is a cross sectional view of an exemplary touch panel display device according to the present invention.

FIG. 6 is a cross sectional view of an exemplary touch panel display device according to the present invention. In FIG. 6, a touch panel display device may include touch panel 60 bonded to a liquid crystal display panel 10 via an upper polarized sheet 14B and adhesive layers 37A and 37B. The touch panel 60 may include an upper transparent sheet 164 upon which is formed an upper transparent film 66Y where an electric field may be applied along a Y-axis direction, a lower transparent sheet 63 upon which is formed a lower transparent film 66X where an electric field may be applied along an X-axis direction, and a spacer 65 formed between the lower transparent film 66X and the upper transparent film 66Y. The upper transparent sheet 164 may be formed of polyethylene terephthalate (PET), and the lower transparent sheet 63 may be formed of one of glass, plastic, and PET, and the spacer 65 uniformly maintains a gap between upper and lower plates of the touch panel 60. The upper transparent film 66Y and the lower transparent film $66x$ may be formed of one of ITO, IZO, and ITZO.

Figure 7:
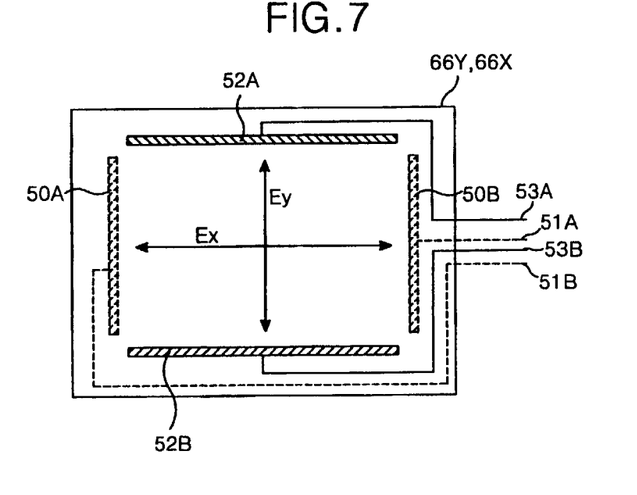
FIG. 7 is a plane view of an exemplary electrode structure of the touch panel display device of FIG. 6 according to the present invention.
Figure 8:
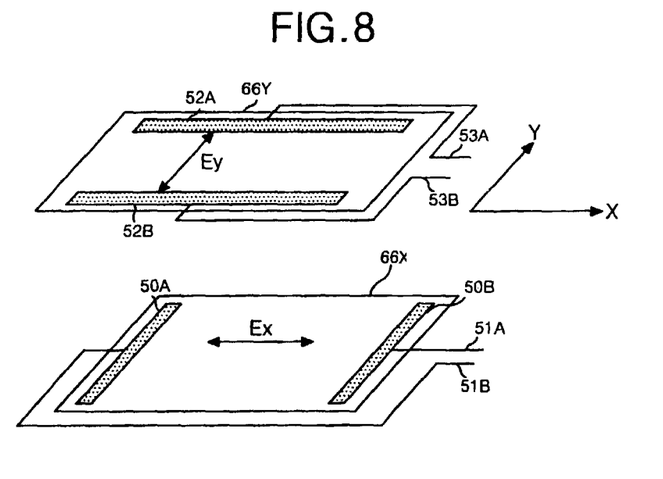
FIG. 8 is a perspective view of the exemplary electrode structure of FIG. 6 according to the present invention.

FIG. 7 is a plane view of an exemplary electrode structure of the touch panel display device of FIG. 6 according to the present invention, and FIG. 8 is a perspective view of the exemplary electrode structure of FIG. 6 according to the present invention.

In FIGS. 7 and 8, X-axis electrodes 52A and 52B may be formed along top and bottom edges of the upper transparent film 66Y, and may be formed by printing silver Ag on the upper transparent film 66Y. The X-axis electrodes 52A and 52B may be formed on the upper transparent film 66Y, and connected to tail lines 53A and 53B having a pad area in a middle portion of a right side of the upper transparent film 66Y to transmit power from the tail lines 53A and 53B. In addition, Y-axis electrodes 50A and 50B may be formed along right and left side edges of the lower transparent film 66X, and may be formed by printing silver Ag on the lower transparent film 66X. The Y-axis electrodes 50A and 50B may be formed on the lower transparent film 66X, and connected to tail lines 51A and 51B having a pad area in a middle portion of the right side edge of the upper transparent film 66Y to transmit power from the tail lines 51A and 51B.

If a voltage is applied to the Y-axis electrodes 50A and 50B, then an electric field Ex along an X-axis direction may be applied between the Y-axis electrodes 50A and 50B. Similarly, if a voltage is applied to the X-axis electrodes 52A and 52B, an electric field By along a Y-axis direction may be applied between the X-axis electrodes 52A and 52B. Accordingly, if the upper transparent sheet 164 is pressed with a stylus or a finger, the upper transparent film 66Y and the lower transparent film $66x$ are electrically shorted together at the corresponding position. Thus, since a resistance value varies in accordance with the pressed position, current and voltage levels change. The current or voltage signals generated when the upper transparent sheet 164 is pressed are detected as coordinate signals by a touch panel controller (not shown). Accordingly, a system may execute a corresponding order or an application program related thereto in response to the detected coordinate signals or an order corresponding to the coordinate signals.

Figure 9:
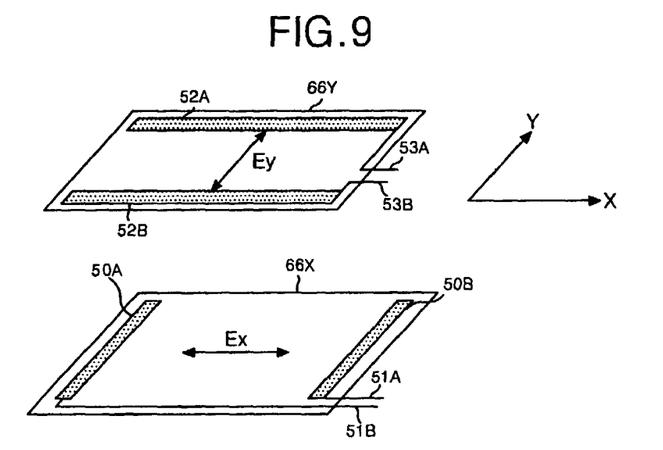
FIG. 9 is a perspective view of another exemplary electrode structure according to the present invention.

FIG. 9 is a perspective view of another exemplary electrode structure according to the present invention. In FIG. 9, tail lines 51A, 51B, 53A, and 53B may be concentrated along a bottom or top portion of a right side edge of a touch panel. Accordingly, no height difference is generated by the upper transparent film 66Y, and a dead space margin (DSM) area may not be formed along the right and/or left side edges of the upper transparent film 66Y. As a result, the touch panel may minimize damage to or breakage of the upper transparent film 66Y at an area when both edges of the upper transparent sheet 164 are directly contacted with a stylus or a finger.

An exemplary fabrication method will now be explained with reference to FIG. 6. First, a transparent conductive material, such as ITO, may be deposited or printed on an entire surface of a lower transparent sheet 63 to form a lower transparent film 66x on the lower transparent sheet 63. In addition, a transparent conductive material, such as ITO, may be deposited or printed on an entire surface of an upper transparent sheet 164 to form an upper transparent film 66y on the upper transparent sheet 164. Subsequently, on the lower transparent film 66x is patterned and printed a highly conductive metal material, such as silver Ag, to form Y-axis electrodes 50A and 50B on the lower transparent film 66x for generating an electric field Ex along an X-axis direction. In addition, on the upper transparent film 66Y is patterned and printed a highly conductive metal material, such as silver Ag, to form X-axis electrodes 52A and 52B on the upper transparent film 66Y for generating an electric field Ey along a Y-axis direction.

The Y-axis electrodes 50A and 50B and the X-axis electrodes 52A and 52B may be respectively formed on the lower transparent film 66X and the upper transparent film 66Y through a deposition and photolithographic processes as well as a pattern-printing method. Subsequently, a spacer 4 of dot type may be formed on the lower transparent film 66X where the Y-axis electrodes 50A and 50B are formed using thick film printing and photolithographic processes. Next, the upper plate and the lower plate of the touch panel 60 may be bonded together by a sealant material.

A liquid crystal display panel 10 to which the touch panel 60 may be bonded may include a lower plate where there is formed a TFT array, a gate line 23, an insulation film 24, a pixel electrode 25A, and a first alignment film 26A on a lower glass substrate 20A. In an upper plate structure of the liquid crystal display panel 10, there may be formed a black matrix 27, a color filter 28, a common electrode 25B, and a second alignment film 26B on a rear surface of the upper glass substrate 20B that faces the lower plate. A lower polarized sheet 14A may be bonded to a rear surface of the lower glass substrate 20A, and an upper polarized sheet 14A may be bonded to a front surface of the upper glass substrate 20B.

The fabricating process of the liquid crystal display panel 10 may be divided into a substrate cleaning process where the lower and upper substrates 20A and 20B may be cleaned, a substrate patterning process where the lower and upper substrates 20A and 20B may be patterned, an alignment film forming process, an upper plate and the lower plate bonding/liquid crystal interposing process, a mounting process, and a test process.

The substrate cleaning process may include cleaning impurities from the lower and upper substrates 20A and 20B with a detergent before and after patterning of the upper and lower plates of the liquid crystal display panel 10.

The substrate patterning process may be divided into an upper glass substrate 20B patterning process and a lower glass substrate 20A patterning process. On the upper glass substrate 20B, there are sequentially deposited and patterned a black matrix 27, a color filter 28, a common electrode 25B, and an alignment film 26B using deposition or printing processes and photolithographic processes. On the lower glass substrate 20A, there are deposited and patterned a gate line 23, an insulation film 24, a semiconductor layer/an ohmic contact layer (not shown), a data line (not shown), a pixel electrode 25A, and a first alignment film 26A using deposition or printing processes and photolithographic processes.

In the upper plate and the lower plate bonding/liquid crystal interposing process following the process of printing and rubbing the alignment films 26A and 26B on the upper and the lower glass substrate 20A and 20B, a sequential processes of an upper and lower substrates 12 and 16 bonding process, the liquid crystal interposing process, and an injection hole sealing process using a sealant material.

In the mounting process, a tape carrier package (TCP) where an integrated circuit IC, such as a gate drive IC and a data drive IC (not shown), are mounted is connected to the pad of the data/gate line on the lower glass substrate 20A.

Figure 10:
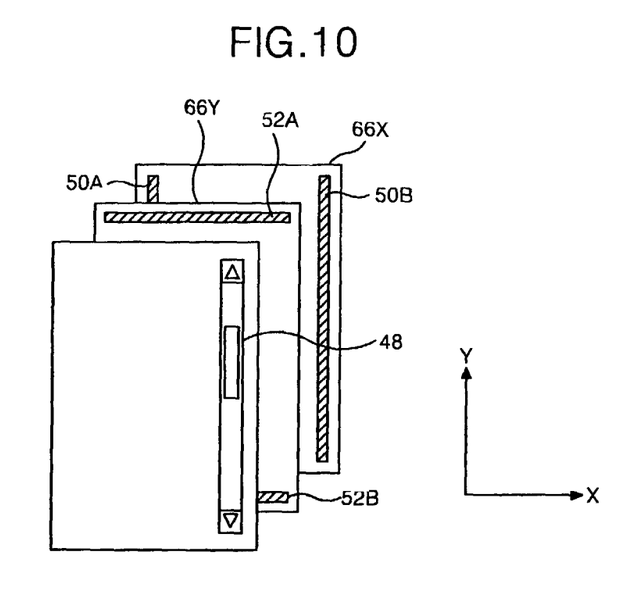
FIG. 10 is a plane view of an exemplary touch panel display device according to the present invention.

FIG. 10 is a plane view of an exemplary touch panel display device according to the present invention. In FIG. 10, when a computer application program is executed, a scroll bar 48 may be displayed long a Y-axis direction along a right side of the computer window where the application is executed, and a dragging operation may be performed along the direction of the scroll bar 48 while pressing the upper transparent sheet 164 with a finger or a stylus. Accordingly, because the dead space margin is decreased and there is no height difference, physical impact to the upper transparent film 66Y may be minimized. As a result, reliability of the touch panel may be increased during the scrolling operation.

The touch panel according to the present invention can be applicable to a touch panel of a terminal where the length of its Y-axis direction is longer than its X-axis direction. For example, in a touch panel of a personal digital assistant (PDA), a touch panel is longer in a Y-axis direction than an X-axis direction. Accordingly, if the upper plate electrode of the touch panel is formed along the Y-axis, there is a higher possibility of the upper transparent sheet being damaged at the scroll bar 48 position than in the touch panel with a longer length along the X-axis direction. The touch panel according to the present invention forms a long upper plate electrode along the X-axis direction of the touch panel that is longer in its Y-axis direction, thereby preventing damage of the upper transparent film without lessening the reliability of its operation.

It will be apparent to those skilled in the art that various modification and variations can be made in the touch panel display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A touch panel display device, comprising:
   a display panel having a scroll bar extending along a Y-axis direction;
   a lower transparent sheet bonded to the display panel;
   an upper transparent sheet over the lower transparent sheet and separated from the lower transparent sheet;
   an upper conductive transparent film formed on the upper transparent sheet and having only a pair of first electrodes extending only along a X-axis direction that perpendicularly crosses the Y-axis direction of the scroll bar with no electrodes extending along the Y-axis, wherein each of the first electrodes has a shape with two longer opposing sides and two shorter sides;
   a lower conductive transparent film formed on the lower transparent sheet and having only a pair of substantially opposing second electrodes extending only along the Y-axis direction, wherein the lower conductive transparent film is disposed between the display panel and the upper conductive transparent film, wherein each of the second electrodes has a shape with two longer opposing sides and two shorter sides;

a first tail line directly connected to one of the two shorter sides of one of the first electrodes;

a second tail line directly connected to one of the two shorter sides of the other one of the first electrodes;

a third tail line directly connected to one of the two shorter sides of one of the second electrodes; and a fourth tail line directly connected to one of the two shorter sides of the other one of the second electrodes, wherein the second electrodes and the first through the fourth tail lines are concentrated along a plurality of edges of the touch panel so as not to form a dead space margin along an edge of the touch panel extending in the Y-axis.

2. The device according to claim 1, wherein the upper transparent sheet includes polyethylene terephthalate, and the lower transparent sheet includes at least one of glass, plastic, and polyethylene terephthalate.

3. The device according to claim 1, wherein the touch panel has a length longer along the Y-axis direction of the scroll bar than along the X-axis direction.

4. The device according to claim 1, wherein the pair of second electrodes is formed along right and left edges of the lower conductive transparent film.

5. The device according to claim 1, wherein the pair of first electrodes is formed along top and bottom edges of the upper conductive transparent film.

6. The device according to claim 1, wherein the pair of first electrodes and the pair of second electrodes have rectangular shapes.

7. The device according to claim 6, wherein one or more of the first tail line, the second tail line, the third tail line, and the fourth tail line is directly connected to a corner of the electrode.

8. A method of fabricating a touch panel display device, comprising:

providing a display panel having a scroll bar extending along a Y-axis direction;

forming an upper conductive transparent film on an upper transparent sheet and a lower conductive transparent film on a lower transparent sheet;

forming only a pair of first electrodes on the upper conductive transparent film formed on the upper transparent sheet, the pair of first electrodes extending only along a X-axis direction that substantially perpendicularly crosses the Y-axis direction of the scroll bar with no electrodes extending along the Y-axis, wherein each of the first electrodes has a shape with two longer opposing sides and two shorter sides;

forming only a pair of second electrodes on the lower conductive transparent film formed on the lower transparent sheet, the pair of second electrodes extending only along the Y-axis direction, wherein the lower transparent film is disposed between the display panel and the upper transparent film, wherein each of the second electrodes has a shape with two longer opposing sides and two shorter sides;

forming a first tail line directly connected to one of the two shorter sides of one of the first electrodes;

forming a second tail line directly connected to one of the two shorter sides of the other one of the first electrodes;

forming a third tail line directly connected to one of the two shorter sides of one of the second electrodes; and forming a fourth tail line directly connected to one of the two shorter sides of the other one of the second electrodes, wherein the second electrodes and the first through the fourth tail lines are concentrated along a plurality of edges of the touch panel so as not to form a dead space margin along an edge of the touch panel extending in the Y-axis.

9. The method according to claim 8, wherein the upper transparent sheet includes polyethylene terephthalate, and the lower transparent sheet includes at least one of glass, plastic, and polyethylene terephthalate.

10. The method according to claim 8, wherein the touch panel display device has a length longer in the Y-axis direction of the scroll bar than along the X-axis direction perpendicularly crossing the Y-axis direction of the scroll bar.

11. The method according to claim 8, wherein the pair of second electrodes is formed along right and left edges of the lower conductive transparent film.

12. The method according to claim 8, wherein the pair of first electrodes is formed along top and bottom edges of the upper conductive transparent film.

13. The method according to claim 8, wherein the pair of first electrodes and the pair of second electrodes are formed in rectangular shapes.

14. The method according to claim 13, wherein one or more of the first tail line, the second tail line, the third tail line, and the fourth tail line is formed to directly connect to a corner of the electrode.

* * * * *